July 24, 1962   J. McEWAN   3,045,398
LAWN MOWER SHARPENER
Filed Jan. 2, 1959   8 Sheets-Sheet 1

FIG_1

FIG_2

INVENTOR.
JAMES McEWAN
BY
*Allen and Chromy*
ATTORNEYS

INVENTOR.
JAMES McEWAN

United States Patent Office 3,045,398
Patented July 24, 1962

3,045,398
LAWN MOWER SHARPENER
James McEwan, 138 Stockton Ave., San Jose 11, Calif.
Filed Jan. 2, 1959, Ser. No. 784,782
13 Claims. (Cl. 51—48)

The present invention relates to lawn mower sharpeners, and is concerned more particularly with an improved sharpener which provides an effective sharpening action with ease of operation for the operator.

It is a general object of the invention to provide a lawn mower sharpener which can be used to sharpen both the reel blades and the bed knife easily and accurately.

Another object of the invention is to provide a lawn mower sharpener of the above character in which the adjustable controls the operator uses are so located with reference to the machine that the operator can stand at any selected position during the sharpening operation and can easily reach every adjustment.

A further object of the invention is to provide a lawn mower sharpener of the above character employing a grinding head which is mounted for placing of the grinding wheel in a vertical position or horizontal position as desired in the sharpening operation.

Still another object of the invention is to provide a lawn mower sharpener in which the lawn mower reel or bed knife can be quickly aligned with the grinding wheel.

Still a further object of the invention is to provide a lawn mower sharpener in which an accurate and easy adjustment of the lawn mower with respect to the sharpening wheel can be made by a three-point mounting providing for quick alignment of the element to be sharpened with the grinding wheel.

Still another object of the invention is to provide a lawn mower sharpener in which the grinding wheel is carried adjustably on a carriage, and the carriage is mounted in a desirable fashion to provide for sliding movement on the frame in accurately aligned fashion.

Other objects and advantages of the invention will be apparent from the following description of a preferred embodiment thereof, as illustrated in the accompanying drawing, in which:

FIGURE 1 is a perspective view of the lawn mower sharpener;

FIGURE 2 is a perspective view of an attachment for use in sharpening the bed knife of the lawn mower;

FIGURE 3 is a perspective view of the lawn mower sharpener showing a bed knife operatively related to the grinding wheel for sharpening one edge of the bed knife;

FIGURE 4 is a perspective view similar to FIGURE 3 showing the bed knife and the grinding wheel positioned for sharpening another edge of the bed knife;

FIGURE 6 is a sectional view of the bed knife taken in a plane indicated in FIGURE 3;

FIGURE 7 is a fragmentary sectional view taken in a plane indicated by the line 7—7 shown in FIGURE 4;

FIGURE 8 is a plan view of the grinding head taken as shown by the line 8—8 in FIGURE 9;

FIGURE 9 is a front elevational view of the grinding head and the slide plate on which it is mounted, taken as indicated by the line 9—9 in FIGURE 8;

FIGURE 19 is a view similar to FIGURE 7 illustrating the sharpening of the bed knife;

FIGURE 20 is a sectional view taken in the plane indicated by the line 20—20 in FIGURE 19 illustrating the position of the bed knife in a sharpening operation illustrated with reference to the grinding wheel;

FIGURE 21 is a detail view similar to FIGURE 20, but showing another position of the bed knife.

Referring to FIGURE 1, the mower sharpener includes a rectangular frame 10 of welded construction having a leveling screw 11 at the bottom of each leg of the frame. At the top of the frame there is a front rectangular cross bar 12, and rearwardly of the front cross bar 12 there are a pair of cylindrical cross bars 13. The cross bars 13 carry for transverse sliding movement thereon a carriage 16 upon which is mounted a slide plate 17 which carries for adjustment thereon a grinder head 18 including a grinding wheel 15. The front square bar 12 has adjustably mounted thereon a head stock 20, and a tail stock 19 described later in detail. The frame also carries an A-frame structure 21 adjustably mounted thereon and carrying a hook 22 forming part of the three-point mounting for the reel of the mower.

The above parts will be described in greater detail in the following description.

The head stock 20 and the tail stock 19 are mounted on the front rectangular bar 12 by means of rectangular split brackets 26, having spaced ears 27, controlled by an adjusting screw 28. At the front lower corner within each bracket 26 (FIGS. 3 and 5) there is provided a knurled clamping screw 31, which engages a corner of a right angle clamping shoe 32 for the cross bar 12, thereby providing an angular clamping action for mounting of both the head stock 20, the tail stock 19, and for the bed knife positioning pin 36, which is carried by a bracket 40 similar to the brackets 26 for the head and tail stocks.

The tail stock 19 (FIGS. 3 and 4) includes an eccentric or offset tapered mower positioning end or point 37a of a shaft 37, which is journaled in a clamping type sleeve 38, and has an adjusting handle 39. Similarly the head stock 20 is provided with an eccentric or offset conical point 41 (FIGS. 1, 3 and 12) which is carried by a shaft 42 slidably and rotatably mounted in a split boss 43 (FIG. 13) and held in adjusted position therein by a suitable cap screw. Alternatively, a pressure plug 44 (FIG. 13A), for example of nylon, may be seated behind a set screw 46.

Adjacent its rear end the shaft 42 (FIG. 12) carries a handle 47 for rotative adjustment of the conical end 41, and which also engages in a sleeve or cap 48 which provides a journaled mounting for the head 49 of an adjusting screw 51 which is threaded in the boss 52 and has an operating handle 53. By this means, the in-and-out adjustment of the head stock 20 and its conical point 41 by means of the screw 51, can be made without disturbing the rotative positioning of this offset conical point 41, and vice versa.

As seen in FIGURE 4, the supporting pin 36 for the bed knife of the mower illustrated at 56, is threadedly engaged within the boss 57 of an offset arm 58 bolted or secured to the rectangular bracket 40. A clamping nut 55 is provided. In this way the bed knife supporting member or finger can be adjusted vertically and also horizontally to the desired position for holding the bed knife as will be described later.

It is seen therefore that the rectangular frame bar 12 provides a mounting for various support members for a mower during the sharpening operation, and that this mounting provides for holding of the reel of the mower for example, between the tapered member 37a of the tail stock 19 and the tapered member 41 of the head stock 20 in operative position with respect to the grinding wheel 15 as will later appear. It also provides a mounting for the bed knife supporting pin or finger 36 for holding the bed knife 56 in operative position as shown in FIGURES 3 and 4 for example.

Figures 10, 11, 12, 13, 13A:
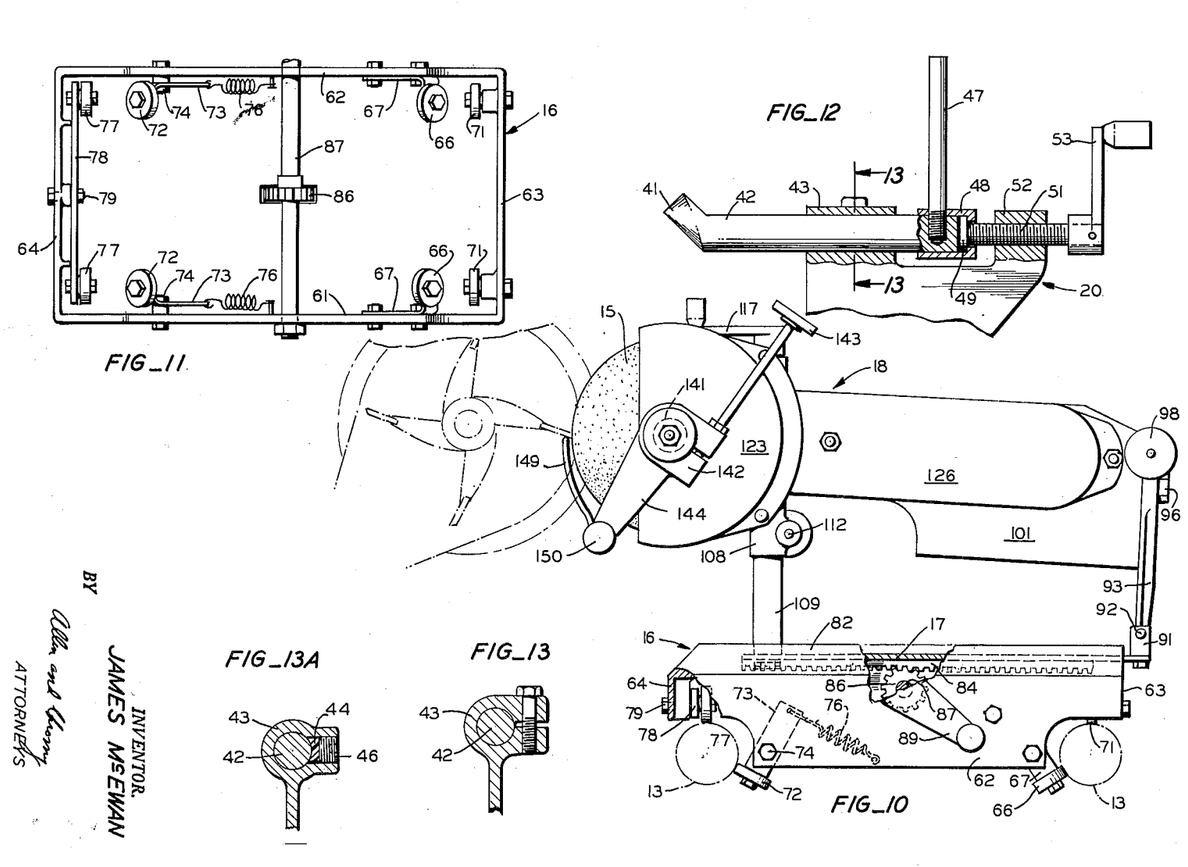
FIGURE 10 is an elevational view, partially in section, of the grinding head shown in vertical position and its carriage, as viewed from the right in FIGURE 9.
FIGURE 11 is a bottom view of the slide plate mounting carriage.
FIGURE 12 is a detail sectional view taken in a plane of the line 12—12 in FIGURE 1 and showing the head stock.
FIGURE 13 is a fragmentary detail view taken in a plane as indicated by the line 13—13 in FIGURE 12.
FIGURE 13A is a fragmentary detail view of a modified mechanism similar to FIGURE 13.

As previously described, the carriage 16 (FIGS. 10 and 11) provides a mounting for the grinding head 18 and its grinding wheel 15 and is mounted for sliding movement on the cylindrical cross bars 13. This carriage 16 is generally of rectangular construction, and has downwardly projecting side flanges 61 and 62 (FIGURE 11) and end flanges 63 and 64. The side flanges 61 and 62 carry a pair of fixed rollers 66, carried by bent arms 67 suitably bolted on the flanges 61 and 62, and opposed to a pair of rollers 71 carried in an adjacent end wall 63. The side flanges 61 and 62 also carry a pair of movable rollers 72, each carried by a bent arm 73 pivoted at 74 on the adjacent flange 61 or 62 and connected at one end to a tension spring 76, also connected to the adjacent flange of the carriage. The spring 76 urges the associated arm 73 to engage the roller 72 against the adjacent bar 13 as seen in FIGURE 10. The provision of the spring-urged rollers 72 provide for movement of these rollers to a withdrawn position to allow insertion of the carriage in the place as seen in FIGURE 10, and thereafter when released the rollers 72 positively engage the adjacent bar 13 to hold the carriage securely in place. It will be noted that the rollers 77 (FIGURE 11) cooperating with the rollers 72, are journaled on an arm 78 which is pivoted intermediate its ends at 79 on the adjacent flange 64 of the carriage. In this way in effect a three-point mounting of the roller members are provided, this pivoted roller structure cooperating with the spring-urged rollers to maintain the carriage evenly in position on the rail and to prevent binding because of misalignment.

Figures 15, 16:
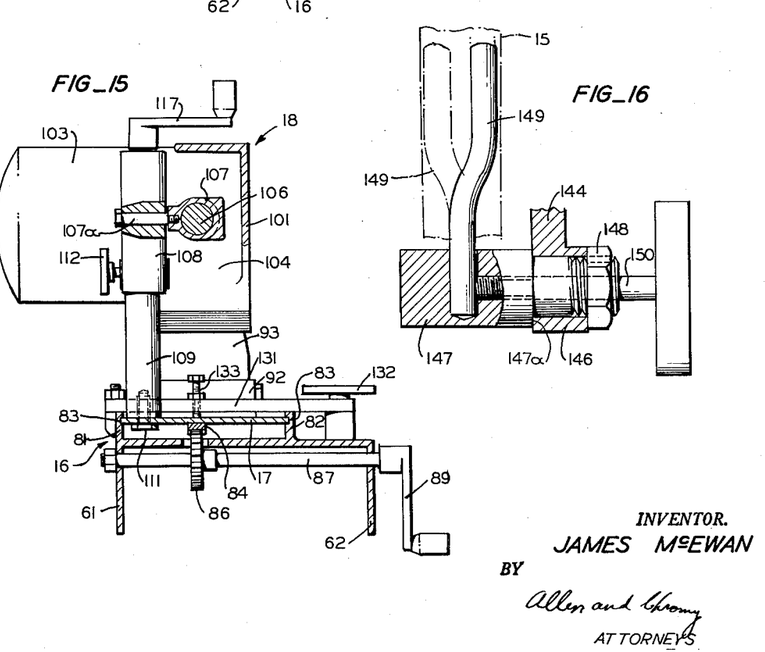
FIGURE 15 is a sectional view taken in the plane of the line 15—15 in FIGURE 14 illustrating certain details of the construction of the grinding head.
FIGURE 16 is a detail sectional view taken in a plane indicated by the line 16—16 in FIGURE 14.

Referring to FIGURES 10 and 15, the carriage 16 has a pair of upstanding walls or flanges 81 and 82, in which milled grooves or guideways 83 are provided to receive the slide plate 17 which is mounted for adjustable movement therein and its underside carries a longitudinal rack 84. The rack 84 is engaged by a pinion 86 (FIGURE 15) carried by a shaft 87 journaled in the downwardly projecting flanges 62 and an ear 88, and carrying an adjusting crank 89 by means of which the carriage can move back and forth in its guideways 83.

Figure 14:
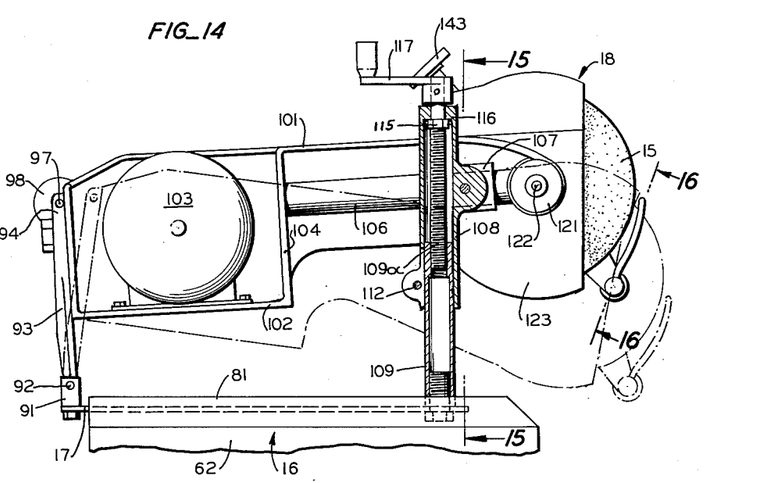
FIGURE 14 is a view of the grinding head as viewed from the left in FIGURE 9.

The slide plate 17 (FIGS. 10, 14 and 17) provides a mounting for the grinding head 18 and for this purpose has at its rear end a bracket 91 pivotally mounting at 92, an upstanding member 93, and this member 93 has at its upper end a split boss 94 (FIGURE 17) in which is pivoted and clamped a pivot shaft 96 carried by the frame 101 of the grinding head 18. A clamping screw 97 is threaded into the split boss 94, and has a hand wheel 98 by means of which the pivot shaft 96 can be clamped in the desired selected position. The grinding head frame 101 (FIGS. 14 and 15) has a mounting flange 102 for a motor 103 secured thereto. At the front of the motor mounting flange 102 there is a transverse wall 104 carrying a shaft 106 extending parallel to the length of the grinding head frame 101 and mounted adjacent its front end in a swivel sleeve 107 pivotally mounted by pin 107a in an upright sleeve 108. The shaft 106 is secured at its front end in the frame casting 101.

The sleeve 108 (FIGURE 14) is slidably mounted on an upright post 109 secured to the slide plate 17 by a cap screw 111, and having a reduced internally threaded upper end engaged by an adjusting screw 109a. The upper end of the screw 109a carries an operating handle 117 and is journaled in a boss 116 of sleeve 108. A nut 115 fixed to screw 109a abuts the lower face of the boss 116. By rotation of the handle or crank 117, the front end of the grinding head frame can be raised and lowered about the pivotal mounting 92. A clamp screw 112 is threaded in the split lower end of sleeve 108 to lock it in adjusted position.

Adjacent its front end the grinding head frame 101 (FIGS. 14 and 18) has a boss 121 which provides the mounting for a shaft 122 carrying the grinding wheel 15 adjacent one end thereof within a guard 123. The shaft 122 carries adjacent the grinding wheel 15 a pulley 124 to receive a belt 125, which extends rearwardly past the grinding head frame 101 under a cover 126 and is connected to a suitable pulley on the shaft of the motor 103.

Figure 17:
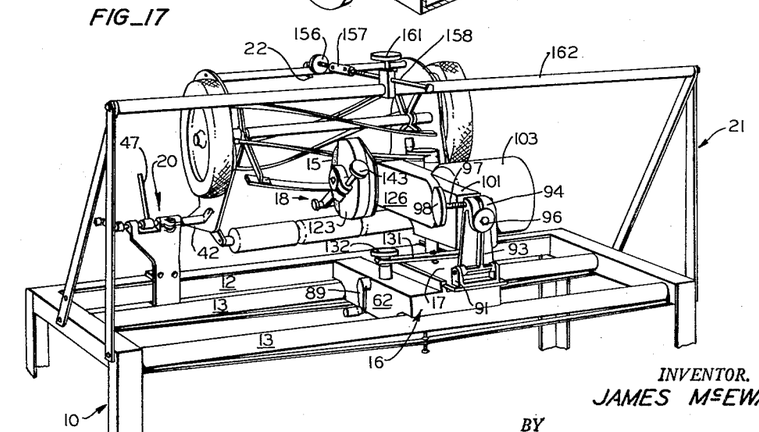
FIGURE 17 is a perspective view from the rear of the lawn mower sharpener showing a lawn mower reel mounted for sharpening.
Figure 18:
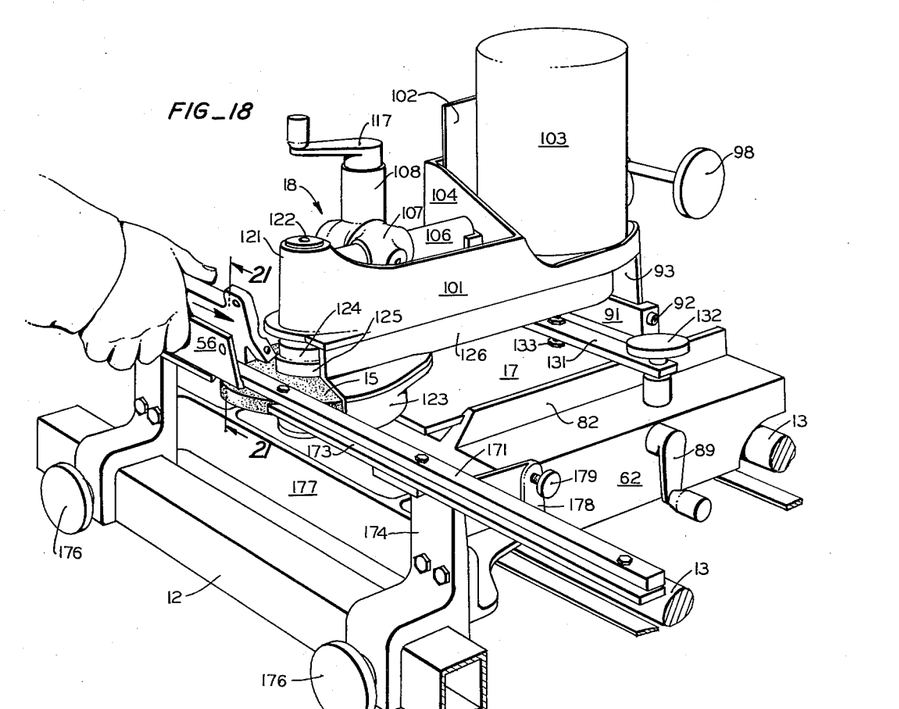
FIGURE 18 is a perspective view showing the sharpener as employed with the attachment illustrated in FIGURE 2.

The shaft 106 (FIGURE 14) is in axial alignment with the pivot shaft 96 (FIGURE 17) so that the entire grinding head can be rotated about this axis to adjust from the position shown in FIGURE 17 for example, to that shown in FIGURE 18.

The grinding head can be run in and out with respect to the front of the machine by movement of the slide plate 17 in its guide ways 83, and it can be clamped in a selected position by means of a clamping bar 131 (FIGURE 15) extending across the flanges 81 and 82, and having at one end a clamping nut 132 engaged therewith, a pressure stud 133 being provided intermediate the ends of the bar 131 and extending below to engage the slide plate 17.

An adjustable reel blade support or guide pin is provided, and for this purpose the shield 123 (FIGURE 10) for the grinding wheel 15 has a boss extension 141, which pivotally receives a split collar 142 having a clamping nut 143 associated therewith. The collar 142 has a downwardly extending arm 144 provided at its lower end with a boss 146 (FIGURE 16) carrying the small end of a support and locking pin 147 having a clamping nut 148 threaded thereon to hold the boss 146 against the shoulder 147a of the pin 147. The large end of the pin 147 is apertured to provide a pivotal mounting for a reel guide pin 149. A clamping screw 150 is threaded into the pin 147 to engage and clamp the reel support finger or pin 149 in any of a plurality of adjusted positions thereof as shown for example in dotted lines in FIGURE 16.

The adjustment of the finger 149 vertically or circumferentially about the grinding wheel 15 is effected by loosening the clamping screw 143 and its split collar 142.

The three-point mounting of the lawn mower reel previously referred to is of course effected in part by the head and tail stocks 20 and 19, respectively, and also by the overhead support or holding finger 22 previously referred to. The finger 22 (FIGURE 1) has a threaded shank which is engaged by a clamping nut 156, and is also threaded in a turnbuckle 157, having its reversely threaded rear end engaged with a threaded rod 158 received and clamped in a mounting block 159 by means of a set screw 161, the mounting block 59 being pivotally engaged with the overhead rod 162 of the A-frame 21. By engaging the hook 22 with a suitable part of the mower assembly such as a transverse bar and adjusting the locking nut 156 to prevent disengagement, the reel can be supported in the desired position with respect to the grinding wheel 15. The turnbuckle 157 is used for fine in or out adjustment of the reel, to regulate depth of the grind, the mower being hinged on its pivotal mounting on the head stock 20 and the tail stock 19.

In the sharpening of a lawn mower, the first operation is to mount the reel of the mower on the machine, and for this purpose, as seen in FIGURE 17, the off-set ends of the head stock 20 and the tail stock 19 are brought into position in engagement with aligning holes of the lawn mower reel or reel frame, being slid lengthwise on the front tubular rail 12 for this purpose. The shaft 42 of the head stock 20 (FIGURE 12) is adjusted by means of the screw 51 and its handle 53. Then the blades of the reel are accurately aligned in parallel relation to the path of travel of the grinding wheel 15, by running the grinding wheel 15 back and forth in front of the blades and adjusting the eccentric ends 37a and 41 of the tail stock 19 and the head stock 20 to the proper position. This adjustment is effected without influence on the amount of tightening that can be effected by operation of the handle 53 to move the head stock centering member inwardly once the desired selected position of the mower is obtained. Thereafter, the finger 149 is adjusted to the desired position with reference to the blade of the reel, and with the grinding wheel in vertical position as shown in FIGURES 1 and 17, the carriage is moved back and forth, preferably cutting in one direction only to effect the desired sharpening of each blade.

After the desired sharpening of the various blades of the reel is effected, the bed knife or cutter bar 51 of the lawn mower is mounted similarly between the head stock and the tail stock and on the finger 36 as shown in FIGURE 4 for example, and a sharpening is made on the knife, the actual cut being effected as shown in FIGURE 7. Thereafter, with the bed knife in the position shown in FIGURE 4, the grinding head carriage is adjusted to place the grinding wheel 15 in a horizontal position as shown in FIGURE 3, and another cut made as shown in FIGURE 6.

Referring to FIGURE 2 there is shown a grinding attachment for optional use in sharpening the bed knife of a lawn mower, this attachment being constructed for drop-on mounting on the cross bar 12 to place its parts in operative relation to the grinding wheel 15, and for this purpose also a drop-on mounting with respect to the grinding head carriage 16 is provided. As shown in FIGURE 2 this bed knife grinding attachment comprises a transverse guide bar 171, having secured therebeneath a pair of transversely off-set shorter guide bars 172 and 173 which are spaced apart to permit insertion of the grinding wheel 15 therebetween. These guide bars are secured to each other and respectively to the upper end of a pair of brackets 174, which have clamping nuts 176 associated therewith to engage the cross bar 12. Also, the brackets 174 are connected by a cross piece 177, having a pair of rearwardly projecting flanges 178, adapted to engage at either side of the carriage 16 when the attachment is in place, and these extensions or brackets 178 have a pair of set screws 179 for engagement with the side walls of the carriage 16 to hold the carriage 16 and to place the attachment accurately in position with respect to the grinding wheel 15 in its horizontal position as shown for example in FIGURE 18.

In this FIGURE 18, the manually held bed knife 51 is being moved past the grinding wheel to effect the type of cut shown in FIGURE 21. Similarly, the operation of sharpening the other edge of the bed knife 51 is shown in FIGURES 19 and 20.

Figures 5, 22, 24:
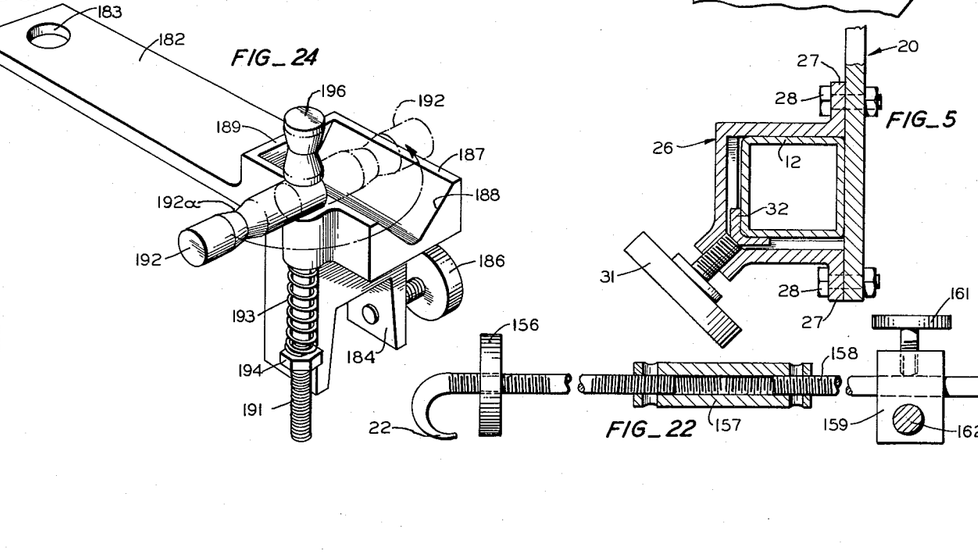
FIGURE 5 is a detailed sectional view taken as indicated by the line 5—5 in FIGURE 3 showing the mounting of certain of the mower support elements, in this case the head stock.
FIGURE 22 is a sectional view partially in elevation taken as indicated by the line 22—22 in FIGURE 1.
FIGURE 24 is a perspective view of one of the attachments.
Figure 23:
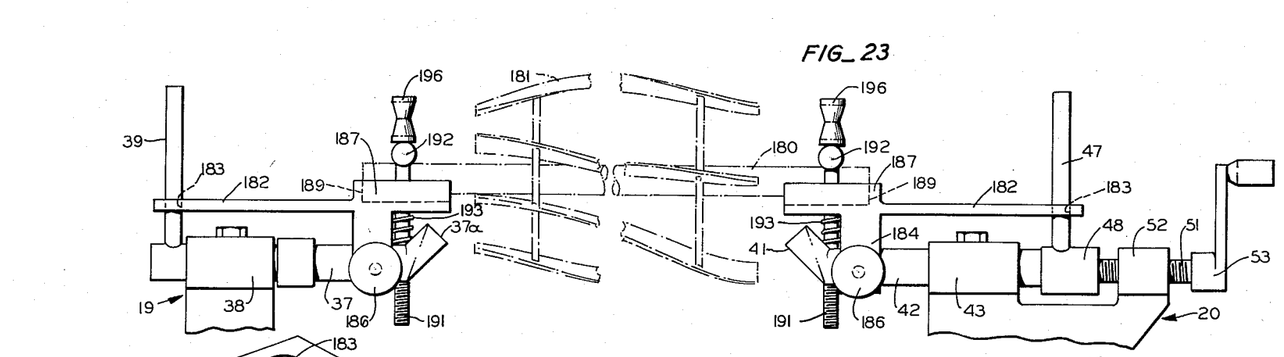
FIGURE 23 is a fragmentary elevational view of the sharpening apparatus illustrating its use with certain attachments for holding large size mower reels.

Referring to FIGURES 23 and 24, there is illustrated a lawn mower sharpening apparatus for use with large size lawn mower reels such as shown at 181 in FIGURE 23 where the reel is removed from the mower and the reel shaft itself is available for alignment of the reel with respect to the grinding wheel. The left-hand attachment or bracket includes an elongated body portion 182 having an aperture 183 adjacent one end for drop-on mounting over the adjusting handle 39 of the associated aligning shaft 37, for example, the body portion 182 has at its opposite or inner end a depending U-shaped portion 184 for drop-on engagement over the shaft 37. A set screw 186 is provided for tightening the bracket 182 on the shaft 37, and the set screw 186 is located below center of the shaft 37. In this way, a very simple yet rigid mounting for the attachment 182 is provided. At its inner end the frame or body portion 182 has an elevated mounting pad 187 having V-shaped recess 188 in its upper end to receive the shaft 182, and having a stop or wall 189 at the outer end of the recess 188. A boss 190 at one side for slidably and rotatably receiving a shaft 191 has secured thereon a transverse grooved clamping shaft 192, the shaft 191 being spring-urged downwardly by a spring 193 seated against an adjusting nut 194. A handle portion 196 is provided at the upper end of the shaft 191 by means of which the shaft can be raised and the clamping shaft 192 with its V-shaped clamping groove 192a swung over and above the reel shaft 182. The right-hand attachment is similar and similarly numbered.

The V-shaped aligning sockets 188 provide for accurate location of the reel shaft 182 between the stop walls 189 and retain the exact aligning adjustments by rotative movement of the shafts 37 and 41. These mounting brackets 182 can be quickly installed on the lawn mower sharpener and as quickly removed when they are no longer required.

While I have shown and described a preferred embodiment of the invention, it will be apparent that the invention is capable of variation and modification from the form shown so that the scope thereof should be limited only by the scope of the claims appended hereto.

I claim:

1. In a lawn mower sharpener, a frame including at least three transverse parallel rails, one of said rails being rectangular in cross section, respective head and tail stocks slidably mounted on said rectangular rail and having respective eccentric ends for pivotal engagement with the reel of a mower, a carriage mounted for sliding movement on two of the other rails, a slide plate mounted for back and forth movement on said carriage in a direction at right angles to the travel of said carriage, a grinding head including a grinding wheel and a drive motor therefor, said grinding head having a support member for supporting said grinding head as a unit, means for pivotally supporting the rear end of said support member on said slide plate, means for adjustably supporting the forward end of said support member on said slide plate, means for adjusting the vertical position of the forward end of said support member whereby said grinding wheel may be raised or lowered with respect to said slide plate and means for clamping said support member against rotation whereby said grinding wheel may be fixed in a horizontal position or in a vertical position after the grinding head is rotated to prevent the grinding wheel in the selected one of these positions.

2. In a lawn mower sharpener, a frame including at least three transverse parallel rails, one of said rails being rectangular in cross section, respective head and tail stocks slidably mounted on said rectangular rail and having respective eccentric ends for pivotal engagement with the reel of a mower, a carriage mounted for sliding movement on two of the other rails, a slide plate mounted for back and forth movement on said carriage in a direction at right angles to the travel of said carriage, a grinding head including a grinding wheel and a drive motor therefor, a pair of upright members positioned at the rear and front ends respectively of said slide plate, means for pivotally attaching the rear one of said upright members to said slide plate, means for adjustably attaching the forward end of said grinding head to the front one of said upright members, means for rotatably attaching said grinding head to said upright members, whereby said grinding wheel may be optionally placed in a vertical position or in a horizontal position and said last mentioned means including clamping means for holding said grinding head so that said grinding wheel may be held in a desired position.

3. In a lawn mower sharpener, a frame, respective head and tail stocks slidably mounted on said frame and having respective eccentric ends for pivotal engagement with the reel of a mower, other connecting means between said reel and said frame for controlling pivotal adjustment of said reel on said eccentric ends, a carriage mounted for sliding movement on said frame, a slide plate mounted for back and forth movement on said carriage in the direction at right angles to the travel of said carriage, a grinding head including a grinding wheel and a drive motor therefor, means for pivotally mounting the rear of said grinding head on said slide plate and means for adjustably mounting in a vertical direction the forward end of said grinding head, said mounting means both having means for rotatable adjustment of said grinding head thereby providing a swingable mounting for said grinding head about a horizontal axis to place said grinding wheel optionally in a vertical position or in a horizontal position.

4. In a lawn mower sharpener, a frame, means for mounting a mower part on said frame, a carriage mounted for sliding movement on said frame, a slide plate mounted for back and forth movement on said carriage in a direction at right angles to the travel of said carriage, a grinding head including a grinding wheel and a drive motor therefor, means for pivotally mounting the rear of said grinding head on said slide plate and means for adjustably mounting in a vertical direction the forward end of said grinding head, said mounting means both having means for rotatable adjustment of said grinding head thereby providing a swingable mounting for said grinding head about a horizontal axis to place said grinding wheel optionally in a vertical position or in a horizontal position.

5. In a lawn mower sharpener, a frame, means for positioning a lawn mower part on the frame, comprising a pair of head and tail stocks slidably mounted on the frame in opposed relation, each of said stocks including a mounting shaft having an eccentrically positioned end for pivotal engagement with a fastening location in the lawn mower part to place said part in alignment therebetween, one of said stocks having in addition thereto thread means for in-and-out adjusting movement of said eccentric positioning means, said one of said stocks having a handle attached thereto extending laterally therefrom for rotating the stock whereby the eccentrically positioned end thereof may be rotatively adjusted.

6. An eccentric positioning means for one end of a lawn mower part to be sharpened, comprising a support having a plurality of aligned bosses, a support shaft slidably and rotatably mounted in one of said bosses and having a projecting eccentric end, the other end of said shaft projecting toward the second of said bosses, a screw threaded in the second of said bosses having an operating handle mounted thereon, said screw having an enlarged end, a sleeve embracing said enlarged end and having a flange extending over the end of said shaft, and an operating handle for said shaft extending through an aperture in said sleeve.

7. In a lawn mower sharpener, a frame, means for positioning a lawn mower part on the frame, comprising a pair of head and tail stocks slidably mounted on the frame in opposed relation, each of said stocks having clamp means for securing the stock in selected positions on said frame, each of said stocks including a mounting shaft rotatably supported on the stock, said shaft having an eccentrically positioned end for pivotal engagement with a fastening location on the lawn mower to place said lawn mower in alignment therebetween, one of said stocks having in addition thereto other means for effecting in-and-out adjusting movement in a direction axially of the mounting shaft of said eccentrically positioned end without affecting the rotative adjustment thereof.

8. In a lawn mower sharpener as recited in claim 7 in which supporting means is provided for the lawn mower part for engagement therewith at an intermediate point on the mower relative to the fastening locations engaged by said eccentrically positioned ends on the stocks, said supporting means including a turnbuckle adjusting means for fine positioning of the reel of the lawn mower with respect to the grinding wheel.

9. In a lawn mower sharpener as recited in claim 7 in which said head and tail stocks have rectangular mounting brackets, and said frame has a rectangular cross bar on which said mounting brackets are engaged, and each mounting bracket includes angle-shaped clamping means forming said clamp means and engaged with a corner of said rectangular cross rail or bar for exerting pressure diagonally thereof.

10. In a lawn mower sharpener, a grinding head including a frame, a grinding wheel journaled on said frame, means for supporting a lawn mower reel in operative relation to said wheel, supporting and guide means for a blade of said reel including a split collar mounted coaxially with said grinding wheel having a downwardly extending arm, clamping means for said split collar to lock it in a desired position, a supporting pin mounted in said downwardly extending arm, means for clamping said supporting pin in place, a positioning finger for the reel having an end portion to guidingly support the reel blade, said finger being pivotally mounted in said pin to permit selective positioning of said end portion relative to the grinding face of said wheel, and a locking screw for said finger carried by said pin.

11. In a bed knife sharpening attachment for a lawn mower sharpener having a carriage mounted for transverse sliding movement, and also including a fixed rectangular front cross rail, an attachment frame including a pair of bracket means for drop-on mounting over said rectangular rail, and including respective extending brackets for positioning at either side of said carriage for connection thereto and means for supporting and guiding the bed knife of the lawn mower when said bed knife is moved past the sharpening element of the lawn mower sharpener, said last mentioned means being attached to said bracket means and including an elongated member extending between said bracket means and adapted to be positioned above the sharpening element of the lawn mower sharpener, said last mentioned means also including a pair of members positioned below and to the side of said elongated member and extending away from said sharpening element on opposite sides thereof to provide a sliding surface for engaging a surface of the bed knife when said bed knife is moved across said sharpening element.

12. In a lawn mower sharpener having a pair of lawn mower reel engaging and adjusting elements opposed to each other in spaced-apart relation, a pair of mounting brackets adapted for drop-on mounting on each of said elements, each bracket having a reel shaft receiving socket having its longitudinal dimension in alignment with the desired shaft axis, and means for releasably holding a reel shaft in engagement with said sockets.

13. In a lawn mower sharpener having a pair of lawn mower reel engaging and adjusting elements opposed to each other in spaced-apart relation, at least one of said elements being mounted for rotative and endwise adjustment, a pair of mounting brackets adapted for drop-on mounting respectively on said elements, each bracket having a reel shaft receiving socket positioned eccentrically to the associated element and having its longitudinal dimension in alignment with the desired shaft axis, and means for pivotally holding a reel shaft in engagement with said socket.

References Cited in the file of this patent

UNITED STATES PATENTS

| | | | |
|---|---|---|---|
| 1,043,948 | Manley | Nov. 12, | 1912 |
| 1,566,614 | Madsen | Dec. 22, | 1925 |
| 2,180,911 | Rogers | Nov. 21, | 1939 |
| 2,286,970 | Maynard | June 16, | 1942 |
| 2,552,994 | Montey | May 15, | 1951 |
| 2,777,258 | Avra | Jan. 15, | 1957 |
| 2,782,566 | Rogers et al. | Feb. 26, | 1957 |
| 2,879,629 | Machovec | Mar. 31, | 1959 |

FOREIGN PATENTS

| | | | |
|---|---|---|---|
| 1,053,642 | France | Feb. 3, | 1954 |